United States Patent
Kim et al.

(10) Patent No.: US 8,547,373 B2
(45) Date of Patent: Oct. 1, 2013

(54) BACK LIGHT UNIT FOR LIQUID CRYSTAL DISPLAY DEVICE AND METHOD FOR FABRICATING THE SAME

(75) Inventors: Jong-Hag Kim, Seoul (KR); Sung-Joong Kim, Gyeonggi-do (KR); Yun-Seo Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 848 days.

(21) Appl. No.: 12/629,422

(22) Filed: Dec. 2, 2009

(65) Prior Publication Data

US 2010/0141647 A1    Jun. 10, 2010

(30) Foreign Application Priority Data

Dec. 9, 2008  (KR) .................. 10-2008-0124568

(51) Int. Cl.
*G09G 3/36* (2006.01)
*G09G 5/00* (2006.01)
*G02F 1/13357* (2006.01)
*H01J 9/00* (2006.01)

(52) U.S. Cl.
USPC ............ 345/214; 345/102; 362/97.2; 349/56; 445/24

(58) Field of Classification Search
None
See application file for complete search history.

(56) References Cited

U.S. PATENT DOCUMENTS

| 6,471,388 | B1* | 10/2002 | Marsh | 362/559 |
|---|---|---|---|---|
| 7,304,627 | B2* | 12/2007 | Kim | 345/97 |
| 7,325,937 | B2* | 2/2008 | Aoki et al. | 362/97.1 |
| 7,407,318 | B2* | 8/2008 | Chang | 362/632 |
| 7,408,599 | B2* | 8/2008 | Tsubokura et al. | 349/58 |
| 8,026,995 | B2* | 9/2011 | Won et al. | 349/58 |
| 8,228,457 | B2* | 7/2012 | Sato et al. | 349/58 |
| 2009/0147173 | A1* | 6/2009 | An et al. | 349/58 |

FOREIGN PATENT DOCUMENTS

| CN | 1664674 A | 9/2005 |
|---|---|---|
| KR | 102008005455 A | 6/2008 |
| KR | 1020080054555 A | 6/2008 |

OTHER PUBLICATIONS

Korean Patent Office Action dated Feb. 21, 2013.

* cited by examiner

*Primary Examiner* — K. Wong
(74) *Attorney, Agent, or Firm* — Morgan, Lewis & Bockius LLP

(57) ABSTRACT

The present invention relates to a back light unit for a liquid crystal display device, which can improve safety and reliability of the back light unit; and a method for fabricating the same.

The back light unit for a liquid crystal display device includes lamps for supplying a light to a liquid crystal display panel, a printed circuit board of a non-conductive plastic having sockets mounted thereto for supplying a high voltage to the lamps, a cover bottom fastened to the printed circuit board, having the lamps received therein, and a hook shaped projection formed as one unit with the printed circuit board for placing in a hole in the cover bottom for fastening the printed circuit board to the cover bottom.

8 Claims, 5 Drawing Sheets

BACK LIGHT UNIT FOR LIQUID CRYSTAL DISPLAY DEVICE AND METHOD FOR FABRICATING THE SAME

CROSS REFERENCE TO RELATED APPLICATION

This application claims the benefit of the Patent Korean Application No. 10-2008-0124568, filed on Dec. 9, 2008, which is hereby incorporated by reference as if fully set forth herein.

BACKGROUND OF THE DISCLOSURE

1. Field of the Disclosure

The present invention relates to liquid crystal display devices, and more particularly, to a back light unit for a liquid crystal display device, which can improve safety and reliability of the back light unit; and a method for fabricating the same.

2. Discussion of the Related Art

In general, the liquid crystal display device displays an image on a screen as a transmission rate of a light beam is controlled in response to a signal applied to a matrix of control switches. Since the liquid crystal display device can not emit the light, the liquid crystal display device requires an additional light source, such as the back light unit.

In the back light units, there are a direct lighting type and an edge lighting type depending on a position of the light source. The edge lighting type back light unit has the light source mounted to one side edge of the liquid crystal display device for directing the light from the light source to a liquid crystal display panel through a light plate and a plurality of optical sheets. The direct lighting type back light unit has a plurality of light sources under the liquid crystal display device for directing the light from the light sources to a liquid crystal display panel through a diffusion plate and a plurality of optical sheets. Currently, the direct lighting type back light unit having brightness, light uniformity, and color purity better than the edge lighting type back light unit is used more than the edge lighting type back light unit, mostly for LCD TV.

The back light unit includes a plurality of lamps, a cover bottom, a diffusion plate, a plurality of optical sheets, a PCB (Printed Circuit Board) having sockets formed thereon for placing the plurality of lamps therein, and an inverter circuit unit for supplying an AC high voltage to the lamps through the sockets.

The PCB is fastened to the cover bottom with conductive screws. There are frequent occasions when sparks take place between the screws and sockets. In more detail, in order to fasten the PCB to an inside space of the cover bottom rigidly, high strength conductive screws are used. However, if securing safe distances between the conductive screws and the sockets fail due to various reasons, such as variation of assembly between the PCB and the cover bottom, degradation of the conductive screw during operation of the back light unit, or so on, the sparks take place between the conductive screws and the sockets. As a result of this, problems in safety and reliability of the back light unit, such as failure of regular lighting of the lamps, and the like, take place.

SUMMARY OF THE DISCLOSURE

Accordingly, the present invention is directed to a back light unit for a liquid crystal display device and a method for fabricating the same.

An object of the present invention is to provide a back light unit for a liquid crystal display device, which can improve safety and reliability of the back light unit; and a method for fabricating the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a back light unit for a liquid crystal display device includes lamps for supplying a light to a liquid crystal display panel, a printed circuit board of a non-conductive plastic having sockets mounted thereto for supplying a high voltage to the lamps, a cover bottom fastened to the printed circuit board, having the lamps received therein, and a hook shaped projection formed as one unit with the printed circuit board for placing in a hole in the cover bottom for fastening the printed circuit board to the cover bottom.

The hook shaped projection includes a hook portion projected beyond the hole and held by the cover bottom, and a body portion positioned within the hole.

The lamps are Cold Cathode Fluorescent Lamp (CCFL).

The lamps are External Electrode Fluorescent Lamp (EEFL).

The back light unit further includes an inverter circuit unit for supplying the high voltage for turning on/off the lamps in succession, and the lamps are turned on/off in succession in a scanning direction of the liquid crystal display panel.

In another aspect of the present invention, a method for fabricating a liquid crystal display device includes the steps of molding a printed circuit board of a non-conductive plastic having a hook shaped projection formed as one unit, providing a cover bottom having a hole at a position opposite to the hook shaped projection, and placing the hook shaped projection in the hole to fasten the printed circuit board to the cover bottom.

The hook shaped projection includes a hook portion and a body portion, and the hook portion is projected beyond the hole and held by the cover bottom.

The method further includes the steps of providing lamps to be fastened to the printed circuit board, and providing an inverter circuit unit for turning on/off the lamps, wherein the lamps are turned on/off in succession in a scanning direction of a liquid crystal display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
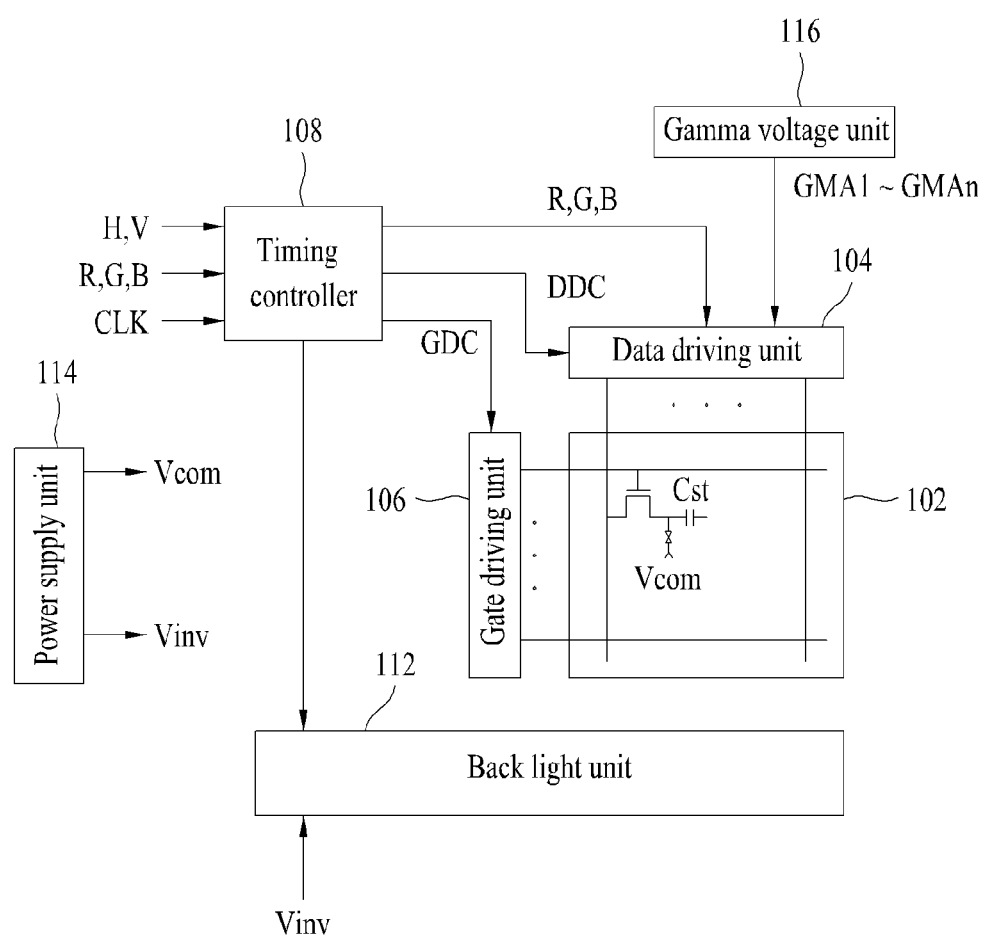
FIG. 1 illustrates a block diagram of a liquid crystal display device in accordance with a preferred embodiment of the present invention.

FIG. 1 illustrates a block diagram of a liquid crystal display device in accordance with a preferred embodiment of the present invention.

Referring to FIG. 1, the liquid crystal display device includes a liquid crystal display panel 102 having data lines and gate lines crossing each other and a thin film transistor at each crossing portion thereof, a data driving unit 104 for supplying data to the data lines of the liquid crystal display panel 102, a gamma voltage unit 116 for supplying a gamma voltage GMA1~GMAn to the data driving unit 104, a gate driving unit 106 for supplying a gate pulse to the gate lines of the liquid crystal display panel 102, and a back light unit 112 for directing a light to the liquid crystal display panel 102. In addition to this, the liquid crystal display device also includes a timing controller 108 for controlling the data driving unit 104, the gate driving unit 106, and the back light unit 112, and a power supplying unit 114 for supplying power to the liquid crystal display panel 102, the data driving unit 104, and the back light unit 112.

The liquid crystal display panel 102 has two sheets of glass between which liquid crystals are injected. The thin film transistor TFT at each of the crossing portions of the data lines and the gate lines of the liquid crystal display panel 102 supplies data from the data lines to the liquid crystal cell in response to a scanning pulse from the gate driving unit 106. The thin film transistor has a source electrode connected to the data line, a drain electrode connected to a pixel electrode of the liquid crystal cell, a gate electrode connected to the gate line.

The timing controller 108 receives digital video data from a digital video card and re-arranges the digital video data, sorting the digital video data into red R, green G, and blue B data. The digital video data R, G, B re-arranged thus at the timing controller 108 are supplied to the data driving unit 104. Also, the timing controller 108 generates a data control signal DDC and a gate control signal GDC by using horizontal and vertical synchronizing signals H, V and a clock signal CLK applied thereto.

The data control signal DDC includes a dot clock Dclk, a source shift clock SSC, a source enable signal SOE, a polarity inverting signal POL, and so on, and is supplied to the data driving unit 104. The gate control signal GDC includes a gate start pulse GSP, a gate shift clock GSC, a gate enable signal GOE, and so on, and supplied to the gate driving unit 106.

The gamma voltage unit 116 generates the gamma voltage GMA1~GMAn, and supplies to the data driving unit 104.

The data driving unit 104 samples data in response to the data control signal DDC from the timing controller 108, and latches the data sampled thus by each of one line portions, and converts the data latched thus into an analog gamma voltage by using the gamma voltage GMA1~GMAn from the gamma voltage unit 116.

The gate driving unit 106 includes a shift register for generating the gate pulse in succession under the control of the timing controller 108, and a level shifter for shifting a voltage of the gate pulse to a voltage level suitable for driving the liquid crystal cell.

The power supplying unit 114 generates a lamp driving voltage Vinv for lighting the lamps in the back light unit 112 for directing the light to the liquid crystal display panel 102, and generates and supplies a common voltage to the liquid crystal cell in the liquid crystal display panel 102.

The back light unit 112 lights the plurality of lamps by using the lamp driving voltage Vinv from the power supplying unit 114 under the control of the timing controller 108 for supplying the light to the liquid crystal display panel 102.

Figure 2:
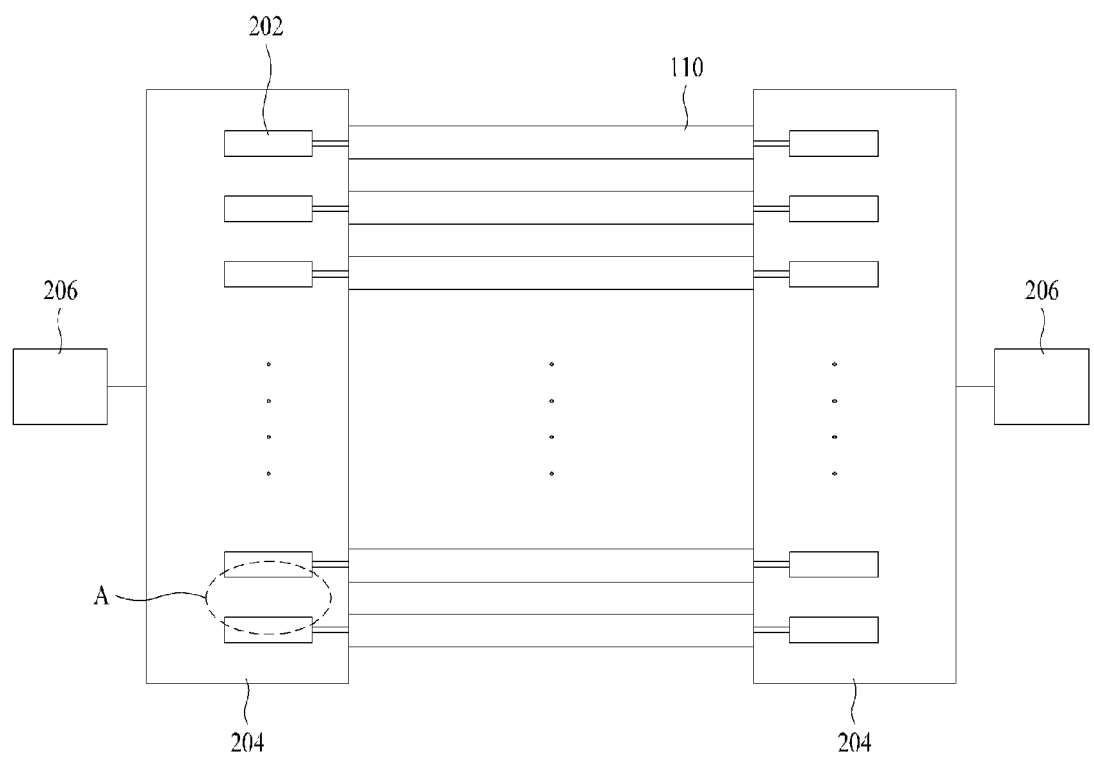
FIG. 2 illustrates a diagram showing detail of the back light unit in FIG. 1.

FIG. 2 illustrates a diagram showing detail of the back light unit in FIG. 1.

Referring to FIG. 2, the back light unit includes a plurality of lamps 110, a printed circuit board 204 having sockets 202 mounted thereto for bringing into contact with the lamps 110 electrically, an inverter circuit unit 206 for supplying an AC high voltage to the lamps through the sockets 202, and a cover bottom (not shown) having the printed circuit board 204 fastened thereto. Though not shown, the back light unit 112 also includes a diffusion plate, and a plurality of optical sheets.

The lamps are lit by the AC high voltage from the inverter circuit unit 206 to supply the light toward the diffusion plate. The lamp 110 may be COLD CATHODE FLUORESCENT LAMP (CCFL), or EXTERNAL ELECTRODE FLUORESCENT LAMP (EEFL).

The cover bottom has a structure of container for receiving the plurality of lamps in an inside space thereof, and a reflective plate formed on a bottom of the inside space.

The diffusion plate has a plurality of beads for scattering the light from the lamps for making a difference of brightness on the display surface of the liquid crystal display panel 102 likely to be caused by a difference of positions of the lamps 110 not to take place.

The optical sheets directs the light incident thereto throughout the liquid crystal display panel 102 uniformly and deflects a path of the light in a direction perpendicular to the display surface for focusing the light throughout the display surface.

The socket 202 is composed of a conductive electrode material, electrically connected to the inverter circuit unit 206 and in contact with the lamp 110 directly for supplying the high voltage from the inverter circuit unit 206 to the lamp 110.

The printed circuit board 204 is a molded plastic, and fastened to the cover bottom with a hook and eye button system.

A structure for fastening the printed circuit board 204 to the cover bottom 220 and a method for fastening the same will be described with reference to FIGS. 3 and 4.

Figure 3:
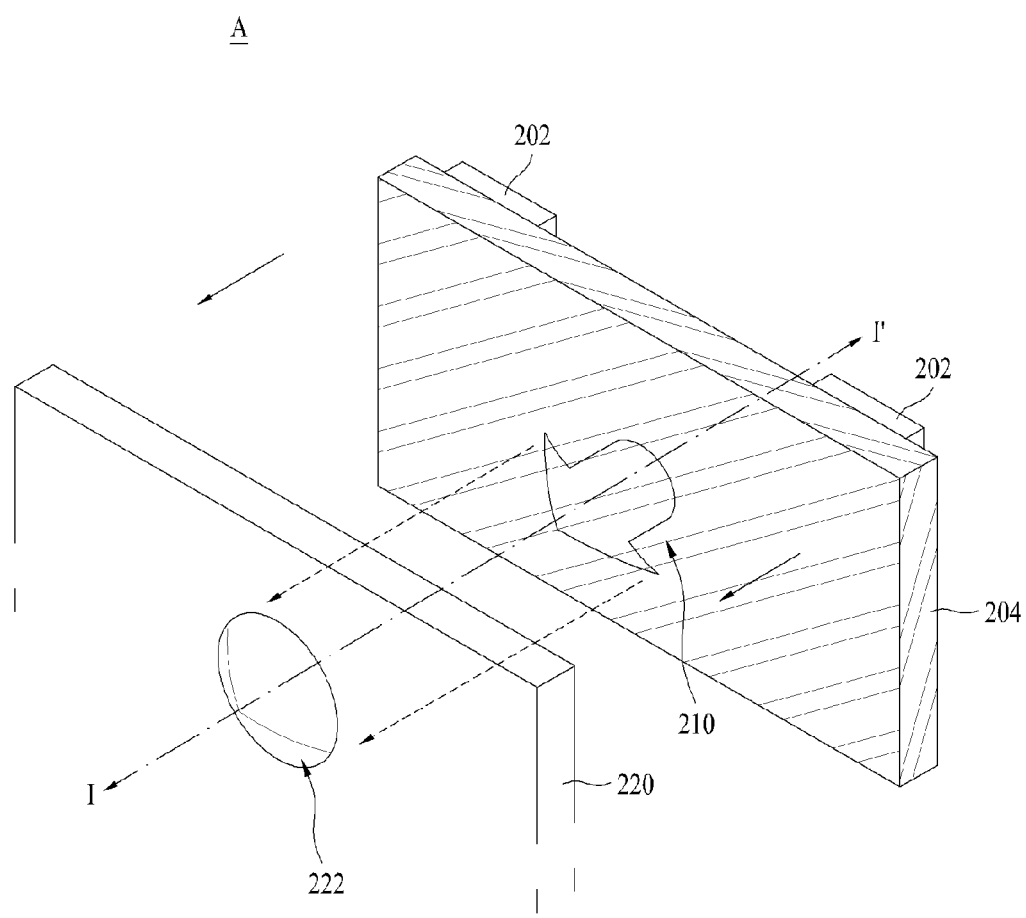
FIG. 3 illustrates a perspective view of A part in FIG. 2 before assembly.
Figure 4:
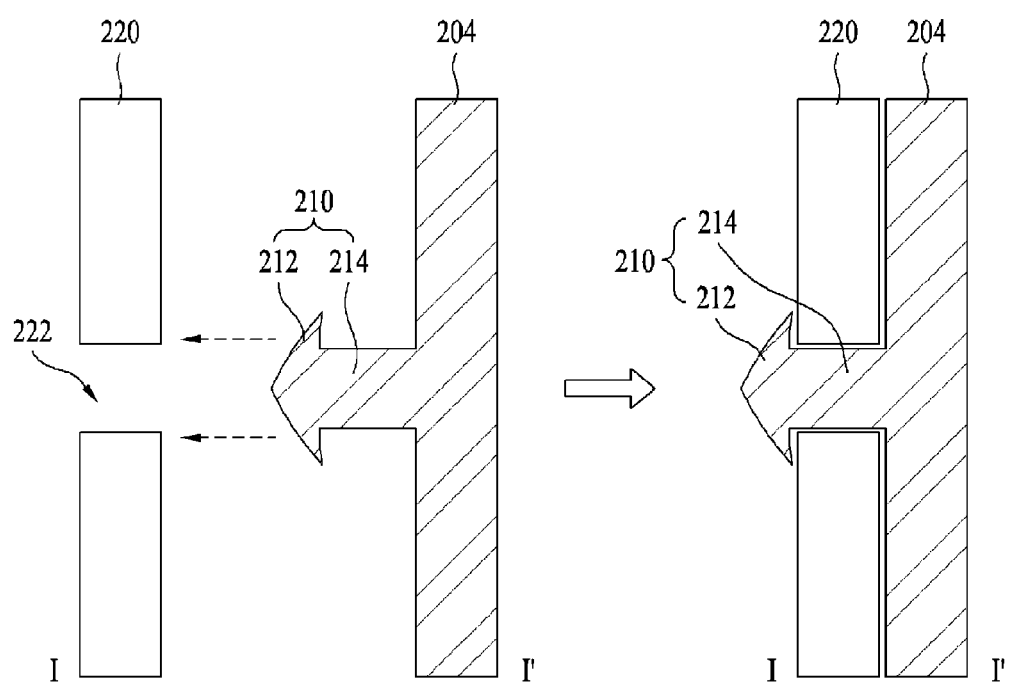
FIG. 4 illustrates a section across a line I-I' in FIG. 3.

FIG. 3 illustrates an enlarged perspective view of A part in FIG. 2 before assembly, and FIG. 4 illustrates a section across a line I-I' in FIG. 3.

Referring to FIGS. 3 and 4, the printed circuit board 204 has a front with the socket 202 mounted thereto and a rear with a hook shaped projection 210 formed as one unit with the printed circuit board 204. Since the projection is molded together with the printed circuit board 204, different from the related art, the projection 210 is not conductive. The projection 210 may have a hook portion 212 and a body portion 214.

The cover bottom 220 has a hole 222 for placing the projection 210 therein. After aligning the projection 210 and the hole 222 in the cover bottom 220 for fastening the printed circuit board 204 to the cover bottom 220, the projection 210 of the printed circuit board 204 is placed in the hole 222 in the cover bottom 220. As a result of this, as shown in FIG. 4, the hook portion 212 of the projection 210 is passed through the hole 222 completely, and projected beyond the cover bottom 220 such that the hook portion 212 is held by the cover bottom 220. The body portion 214 of the projection 210 is, not exposed to an outside of the cover bottom 220, but positioned within the hole 222. As a result of this, the printed circuit board 204 can be secured to the cover bottom 220, firmly.

Different from the related art, since the projection 210 is formed as one unit with the printed circuit board 204, the projection 210 has high strength, and since the projection 210 is formed of a non-conductive plastic, the projection 210 does not cause sparks with the socket 202. Eventually, since the lighting of the lamps 110 can be made regularly, the safety and reliability of the back light unit 112 can be improved.

Thus, the back light unit for a liquid crystal display device of the present invention includes the printed circuit board 204 of a non-conductive material having the hook shaped projection 210 formed as one unit. The printed circuit board 204 is fastened to the cover bottom 220 with the hook shaped projection 210 of the non-conductive material.

In the meantime, the fastening system can be applicable to any back light unit of direct lighting type. That is, not only a printed circuit board for COLD CATHODE FLUORESCENT LAMP (CCFL), but also a printed circuit board for External Electrode Fluorescent Lamp (EEFL) may use the forming system and material of the present invention and may have the hook shaped projection.

Moreover, the back light unit for a liquid crystal display device and a method for fabricating the same of the present invention has a great effect in a case the same is applied to a scanning back light which can be driven by a scanning system. Particularly, the printed circuit board fastened with the related art screw system causes the problem of spark if the same is applied to the scanning back light unit which can be driven by the scanning system.

Figure 5:
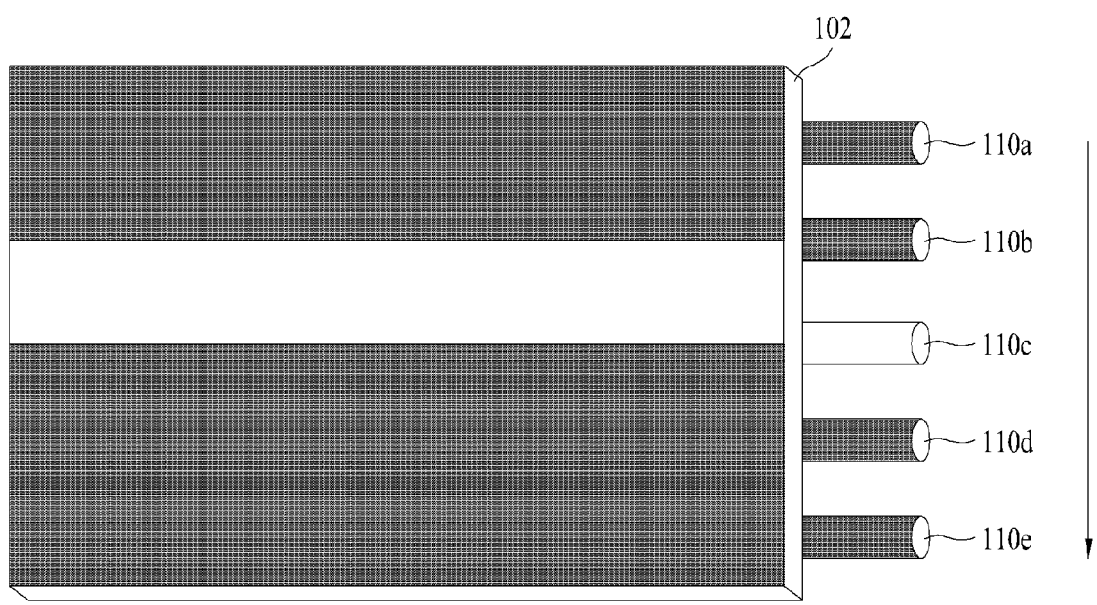
FIG. 5 illustrates a diagram for explaining a scanning back light system.

In general, the scanning back light driving is a system in which the plurality of lamps 110 are turned on/off in a scanning direction. For an example, referring to FIG. 5, while a middle region of the screen, i.e., a region opposite to the third lamp 110c, displays an image as the light is emitted from the third lamp 110c which is turned on, other regions, i.e., regions opposite to the first, second, fourth, fifth lamps 110a, 110b, 110d, and 110e display no images even if data are kept at the liquid crystal cells at the other regions as the first, second, fourth, fifth lamps 110a, 110b, 110d, and 110e are turned off.

The scanning back light system enables quasi-impulse system driving by emitting the light for a period in a one frame, and cutting off the light for rest of the frame. According to this, the scanning back light system can improve a display quality of the liquid crystal display device.

The back light unit which enables the scanning back light system can prevent the sparks from taking place and can have the lamps 110 turned on/off in succession regularly by using the printed circuit board 204 formed of a material and formed by a system described with reference to FIGS. 2 to 4 and having the hook shaped projections formed as one unit.

As has been described, the back light unit for a liquid crystal display device and a method for fabricating the same of the present invention have the following advantages.

By providing the printed circuit board of a non-conductive plastic having a hook shaped projection formed thereon, the printed circuit board is fastened to the cover bottom with the hook shaped projection of the non-conductive plastic. According to this, no spark takes place enabling regular lighting of the lamps, which improves safety and reliability of the back light unit.

Reliability of the successive turning on/off of the lamps can be improved if the scanning back light system is applied to the back light unit having the printed circuit board with the hook shaped projection formed as one unit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A back light unit for a liquid crystal display device comprising:
   lamps for supplying a light to a liquid crystal display panel;
   a printed circuit board of a non-conductive plastic having sockets mounted thereto for supplying a high voltage to the lamps;
   a cover bottom fastened to the printed circuit board, having the lamps received therein; and
   a hook shaped projection formed as one unit with the printed circuit board for placing in a hole in the cover bottom for fastening the printed circuit board to the cover bottom, wherein the hook shaped projection is formed of non-conductive plastic.

2. The back light unit as claimed in claim 1, wherein the hook shaped projection includes;
   a hook portion projected beyond the hole and held by the cover bottom, and
   a body portion positioned within the hole.

3. The back light unit as claimed in claim 1, wherein the lamps are Cold Cathode Fluorescent Lamp.

4. The back light unit as claimed in claim 1, wherein the lamps are External Electrode Fluorescent Lamp.

5. The back light unit as claimed in claim 1, further comprising an inverter circuit unit for supplying the high voltage for turning on/off the lamps in succession, and
   the lamps are turned on/off in succession in a scanning direction of the liquid crystal display panel.

6. A method for fabricating a liquid crystal display device comprising the steps of:
   molding a printed circuit board of a non-conductive plastic having a hook shaped projection formed as one unit, wherein the hook shaped projection is formed of non-conductive plastic;
   providing a cover bottom having a hole at a position opposite to the hook shaped projection; and
   placing the hook shaped projection in the hole to fasten the printed circuit board to the cover bottom.

7. The method as claimed in claim 6, wherein the hook shaped projection includes a hook portion and a body portion, and the hook portion is projected beyond the hole and held by the cover bottom.

8. The method as claimed in claim 6, further comprising the steps of:
   providing lamps to be fastened to the printed circuit board; and
   providing an inverter circuit unit for turning on/off the lamps,
   wherein the lamps are turned on/off in succession in a scanning direction of a liquid crystal display panel.

* * * * *